(12) United States Patent
Gendre

(10) Patent No.: US 11,110,644 B2
(45) Date of Patent: Sep. 7, 2021

(54) METHOD FOR MANUFACTURING CONTAINERS FROM BLANKS, WITH DETECTION OF DEFECTIVE OPENING OF SOLENOID VALVES

(71) Applicant: SIDEL PARTICIPATIONS, Octeville-sur-Mer (FR)

(72) Inventor: Julien Gendre, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 821 days.

(21) Appl. No.: 15/111,109

(22) PCT Filed: Jan. 23, 2015

(86) PCT No.: PCT/FR2015/050165
§ 371 (c)(1),
(2) Date: Jul. 12, 2016

(87) PCT Pub. No.: WO2015/121557
PCT Pub. Date: Aug. 20, 2015

(65) Prior Publication Data
US 2016/0332357 A1 Nov. 17, 2016

(30) Foreign Application Priority Data
Feb. 12, 2014 (FR) .................................... 1451098

(51) Int. Cl.
*B29C 49/78* (2006.01)
*B29C 49/36* (2006.01)
(Continued)

(52) U.S. Cl.
CPC ............ *B29C 49/783* (2013.01); *B29C 49/36* (2013.01); *B29C 49/4289* (2013.01);
(Continued)

(58) Field of Classification Search
CPC .................................................. B29C 49/783
See application file for complete search history.

(56) References Cited

U.S. PATENT DOCUMENTS 5,708,355 A * 1/1998 Schrey ...................... F01L 9/04
323/282
5,902,527 A * 5/1999 Flood .................... B29C 49/783
264/40.3
(Continued)

FOREIGN PATENT DOCUMENTS

DE    101 53 045 A1    5/2003
FR    2 872 082 A1    12/2005
(Continued)

OTHER PUBLICATIONS

International Search Report, dated Apr. 30, 2015, from corresponding PCT Application.

*Primary Examiner* — Benjamin A Schiffman (57) ABSTRACT

Method of manufacturing containers by blow-molding in a mold starting from a plastic blank, involving, when manufacturing a container: —a step of introducing a blank into a mold; —at least a step of placing the inside of the blank in communication with at least one fluid circuit by an solenoid valve associated with the circuit; —at a predetermined moment, referred to as the solenoid valve opening pulse (TEV1; . . . ; TEV4), sending a command to open to the solenoid valve which has a theoretical opening delay (Dt1; . . . ; Dt4), the method including steps involving: —calculating the actual opening delay (De1; . . . ; De4) of the solenoid valve; —calculating a difference (Δt1; . . . ; Δt4) between the actual opening delay (De1; . . . ; De4) and the theoretical opening delay (Dt1; . . . ; Dt4); and—if the calculated difference is greater than a maximum permissible difference, emitting notification that a maximum permissible difference has been exceed.

15 Claims, 3 Drawing Sheets

(51) Int. Cl.
*B29C 49/58* (2006.01)
*B29C 49/64* (2006.01)
*B29C 49/42* (2006.01)
*B29C 49/48* (2006.01)
*B29C 49/06* (2006.01)
*B29C 49/12* (2006.01)
*B29K 667/00* (2006.01)
*B29L 31/00* (2006.01)

(52) U.S. Cl.
CPC .............. *B29C 49/58* (2013.01); *B29C 49/64* (2013.01); *B29C 49/06* (2013.01); *B29C 49/12* (2013.01); *B29C 2049/4892* (2013.01); *B29C 2049/5827* (2013.01); *B29C 2049/5841* (2013.01); *B29C 2949/78025* (2013.01); *B29C 2949/78537* (2013.01); *B29K 2667/003* (2013.01); *B29L 2031/7158* (2013.01); *Y02P 70/10* (2015.11)

(56) References Cited

U.S. PATENT DOCUMENTS

| | | | | |
|---|---|---|---|---|
| 5,942,892 | A * | 8/1999 | Li | H01F 7/1844 324/207.16 |
| 5,993,721 | A * | 11/1999 | Kurihara | B29C 49/20 264/402 |
| 2006/0214321 | A1* | 9/2006 | Semersky | B29C 49/78 264/40.1 |
| 2008/0069914 | A1 | 3/2008 | Lamaistre | |
| 2009/0102082 | A1* | 4/2009 | Gattolliat | G05D 16/2013 264/40.3 |
| 2010/0176528 | A1 | 7/2010 | Monin et al. | |
| 2010/0204819 | A1 | 8/2010 | Monin et al. | |
| 2010/0221470 | A1* | 9/2010 | Derrien | B29C 49/46 428/35.7 |
| 2015/0209997 | A1* | 7/2015 | Lemble | B29C 49/783 264/529 |

FOREIGN PATENT DOCUMENTS

| WO | 2006/008380 A1 | 1/2006 |
|---|---|---|
| WO | 2008/081107 A2 | 7/2008 |

* cited by examiner

FIG.2

METHOD FOR MANUFACTURING CONTAINERS FROM BLANKS, WITH DETECTION OF DEFECTIVE OPENING OF SOLENOID VALVES

The invention relates to the manufacture of containers of plastic material from blanks of containers, which are either blanks or intermediate containers, by forming using a fluid.

The invention relates more particularly to a method for manufacturing containers of plastic material, such as PET, by blow molding or by stretch blow molding, in a mold, from blanks with a pressurized fluid, in particular air, of the type in which the production machine has a control system, a thermal conditioning oven and a blow-molding unit comprising several blow-molding stations, each station having a mold, into which the blanks are inserted, coming from the oven, each one to undergo an operation for transforming into a container during a blow-molding step, completed or preceded by intermediate steps, such as a pre-blow-molding step, sometimes associated with a stretching, a fluid recovery step, and a degassing step.

The manufacture of containers, such as bottles, of plastic material by blow molding of blanks is well known.

Before being blow-molded to be shaped into a container, the blank undergoes an appropriate thermal treatment in a thermal conditioning oven. This thermal treatment can be more or less sophisticated as a function of the characteristics of the container to be obtained. It consists in all cases in heating the plastic material of the blank to a temperature higher than its glass transition temperature to make possible its deformation by blow molding or by stretch blow molding.

The blank is then placed in a mold containing a cavity bearing the imprint of the container to be obtained, and then, during the blow-molding step, a blow-molding fluid, generally air under high pressure (typically between 18 and 40 bars), is injected using a nozzle inside the blank to inflate it and to flatten the material along the walls of the mold, which makes it possible to obtain the container.

Preferably, the transformation operation can include a stretching step (also called an elongation step) of the blank using an elongation rod that is associated with the mold and is controlled by sliding toward the bottom of the blank and/or a pre-blow-molding step (typically at a pressure of between 8 and 15 bars). After a certain time for contact of the plastic material against the mold, during a degassing step, the pressure in the container is brought back to the atmospheric pressure before removing the finished container from the mold. In other methods, the degassing step is preceded by a step for recycling a portion of the fluid contained in the container, so as to reinject it for other uses (into the machine itself or into the factory where the machine is installed).

The operation of a blow-molding machine is relatively complex particularly because of the considerable number of parameters that can influence the quality of the containers obtained.

The setting-up of the machine is done by a technician who performs tests, by acting on the different operating parameters of the machine, until the appropriate container quality is obtained at the machine output. It is particularly during the set-up that it is determined whether the transformation operation will have to have a stretching step and/or a pre-blow-molding step, as well as the sequencing of the start times of the various steps used.

If the quality of the containers is good during the initial set-up of the machine, the adjustments made by the technician can, however, be challenged during the operation of the machine in production.

This challenging can occur when parameters external or internal to the machine develop, for example when the ambient conditions of temperature or pressure change, or because of the wear and tear of certain elements of the machine, and even when characteristic parameters of the blanks (such as intrinsic viscosity, quality of the resin, moisture taken up by the material, initial temperature) change during production for various reasons.

These phenomena, when they are not detected, can cause deviations in quality, and even lead to the loss of containers.

In an industrial production context where the manufacturing rates reach several thousands of containers per hour and per mold, it is easily conceivable that deviations in production or losses can have significant financial consequences.

It is known (see the document WO2008/081107 in the name of the applicant) to correlate singular points of an actual blow-molding curve with machine parameters (particularly the flow rate or the pre-blow-molding pressure), and to apply corrections of the parameters as a function of divergence found at these singular points.

However, certain deviations can be corrected only to a limited extent. Actually, one deviation or deviations caused by damage or aging, premature or not, of one or of several mechanical elements present in the machine and which are essential to the functioning of the manufacturing process cannot be corrected, or can only be corrected to a certain extent, by the regulating method described in the previously-cited document WO2008/081107. This could be the case of the damage or aging of solenoid valves present in the machine or even of damage by damper blocking of the return to atmosphere during the degassing.

A machine ordinarily comprises stations, also called blow-molding stations, with molds mounted on the periphery of a rotating carousel.

In the known blow-molding or stretch-blow-molding machines, each blow-molding station or post is positioned so as to ensure that the interior of the hollow body consisting of the blank, at the start of the sequence, then by the formed container, at the end, can be placed in communication in a first step with a pre-blow-molding circuit, then in a second step with a blow-molding circuit, then optionally with a blow-molding fluid recovery circuit, and finally with a degassing circuit (also called an exhaust circuit) to return the interior of the space of the container to atmospheric pressure.

The putting of the interior of the blank, or of the containers, in communication with the circuits of pre-blow molding, of blow molding, if applicable of recovery, and finally of degassing is performed using corresponding solenoid valves that, by convention, will be referred to as pre-blow-molding solenoid valves, blow-molding solenoid valves, recovery solenoid valves, and degassing (or exhaust) solenoid valves. Exhaust dampers, which make it possible to reduce the noise due to the release during the return of the interior of the container to atmospheric pressure, are generally associated with each exhaust circuit (one damper per circuit).

The invention aims in particular to eliminate the drawbacks of the known devices by proposing a method that makes it possible to report that a damaging or an aging of at least one solenoid valve is too advanced to be able to be corrected by the regulating method as previously cited.

The invention also aims to control the service life of the solenoid valves by making it possible to program maintenance operations to prevent any stopping of the machine and thus to optimize its efficiency.

For this purpose, a method is proposed for manufacturing containers by blow molding in a mold of blanks of plastic material comprising, during the manufacture of a container:
a step for inserting a blank into a mold;
at least one step for putting the interior of the blank in communication with at least one fluid circuit by means of an solenoid valve associated with said circuit;
at a predetermined time, referred to as an solenoid valve opening trigger pulse, sending an opening order to said solenoid valve that has a theoretical opening delay, i.e., a time that theoretically must pass between the opening trigger pulse and the time when the solenoid valve actually opens;
this method comprising steps consisting in:
calculating the actual delay of opening of said solenoid valve, i.e., the time passed between the opening trigger pulse and an actual time of opening of the solenoid valve;
calculating a difference between the actual delay of opening and the theoretical delay of opening;
if the difference calculated is greater than a maximum allowable difference, transmitting a notification of exceeding the maximum allowable difference.

Thus, by detecting excessive opening differences, in other words operating deviations relative to reference values, the method makes it possible to ensure an optimal operation of the machines on which it is used, reducing the production losses.

According to various embodiments:
the actual time of opening of the solenoid valve is determined by detecting a variation in pressure occurring in the blank or the container being formed after the opening trigger pulse has been given;
the actual time of opening of the solenoid valve is determined by detecting the occurrence of an impact when a flap contained in the solenoid valve reaches a stop position;
the actual time of opening of the solenoid valve is determined by detecting the movement of a flap or of a control slide of the solenoid valve.

Preferably, the method comprises a step consisting in determining if there is a recurrence of exceeding the maximum allowable difference before transmitting the notification.

In the variants:
the method comprises steps consisting in storing a number of calculated differences for said solenoid valve, and then calculating an average from said stored differences, and, if the calculated average is greater than a maximum allowable difference, transmitting said notification of exceeding the maximum allowable difference.
the method comprises steps consisting in storing a number of calculated differences for an solenoid valve, and then calculating a typical difference from said stored differences, and, if the typical difference calculated is greater than a maximum allowable difference, transmitting said notification of exceeding the maximum allowable difference.

A device is also proposed for using a method as presented above, this device having at least one blow-molding mold, and means for inserting a blank into said mold;
at least one fluid circuit having at least one solenoid valve to put the interior of the blank in communication with said circuit;
means for sending an opening order to said solenoid valve;
means for detecting the actual time of opening of the solenoid valve;
means for calculating a difference between the actual time of opening and a theoretical time of opening;
means for transmitting a notification of exceeding the maximum allowable difference if the calculated difference is greater than a maximum allowable difference.

In certain implementations, the device has at least one pre-blow-molding circuit connected to at least one mold by at least one pre-blow-molding solenoid valve and/or at least one blow-molding circuit connected to at least one mold by at least one blow-molding solenoid valve and/or at least one recovery circuit connected to at least one mold by at least one recovery solenoid valve and/or at least one degassing circuit connected to at least one mold by at least one degassing solenoid valve.

Other characteristics and advantages of the invention will emerge upon reading the description given below with reference to the accompanying drawings in which.

In the description below, the terms "top," "bottom," "horizontal," "vertical," "in front of," "behind," and the derived terms "upper," "lower," etc., are used for the sake of clarity in reference to the orientation of the figures without this having any limiting scope.

Figure 1:
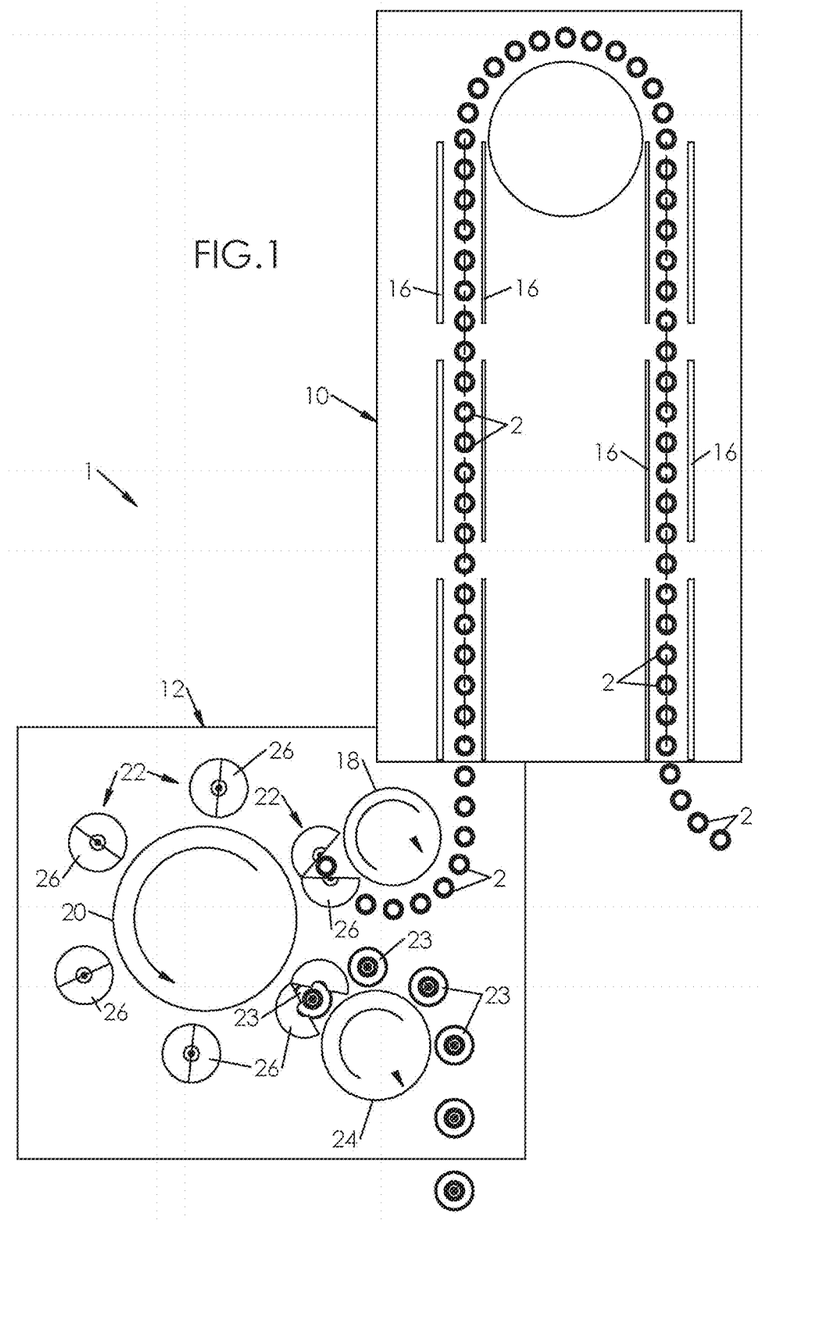
FIG. 1 is a diagrammatic view of a machine for manufacturing containers.

Illustrated diagrammatically in FIG. 1 is a machine 1 for manufacturing containers from blanks of thermoplastic material and more particularly of PET (polyethylene terephthalate).

The blanks 2, here blanks, have a closed bottom, whose shape is generally hemispherical, a cylindrical body and a neck having the final shape of the neck of the container to be obtained (which in general does not undergo the least deformation during the manufacture of the container).

The manufacturing machine 1 comprises an oven 10 and a forming unit 12.

The oven 10 has the function of heating the blanks 2 to a temperature that is greater than or equal to the glass transition temperature of the constituent material, for example higher than 80° C. when this material is of PET.

The oven 10 comprises a conveyor (illustrated diagrammatically) to transport the blanks 2 while causing them to rotate about themselves and radiation emitters 16, such as infrared lamps facing reflectors or laser sources, to heat the blanks 2.

The blanks 2 enter into the oven 10, mounted on the conveyor that executes a U-shaped path. They are heated during the procession by the emitters 16. The emitters 16 and the reflectors, if applicable, are placed on one side or on both sides of the blanks 2 relative to their direction of advance.

The hot blanks are removed from the oven 10 and transferred into molds of the forming unit 12 by a first transfer device 18, such as a transfer wheel, positioned between the oven 10 and the forming unit 12. The transfer wheel comprises arms (not shown, because they are known in the art) that successively grasp the blanks 2, after their exit from the oven 10, in the area of their neck, to insert each of them in turn into a mold 26 of the forming unit 12.

The forming unit 12 comprises a rotating carousel 20 at the periphery of which several blow-molding stations 22 are placed.

Each blow-molding station 22 comprises at least one mold 26 that is usually composed of three parts, namely two half-molds 26A, 26B and a mold bottom 26C, which define the manufacturing cavity of the container.

Each hot blank 2 exiting the oven 10 is inserted into a mold 26 of the blow-molding station 22 to be blow-molded there and transformed into a container 23. Once finished, the container 23 is removed from the blow-molding station 22 by a second transfer device 24, similar to the first transfer device 18, and well known to a person skilled in the art.

Figure 2:
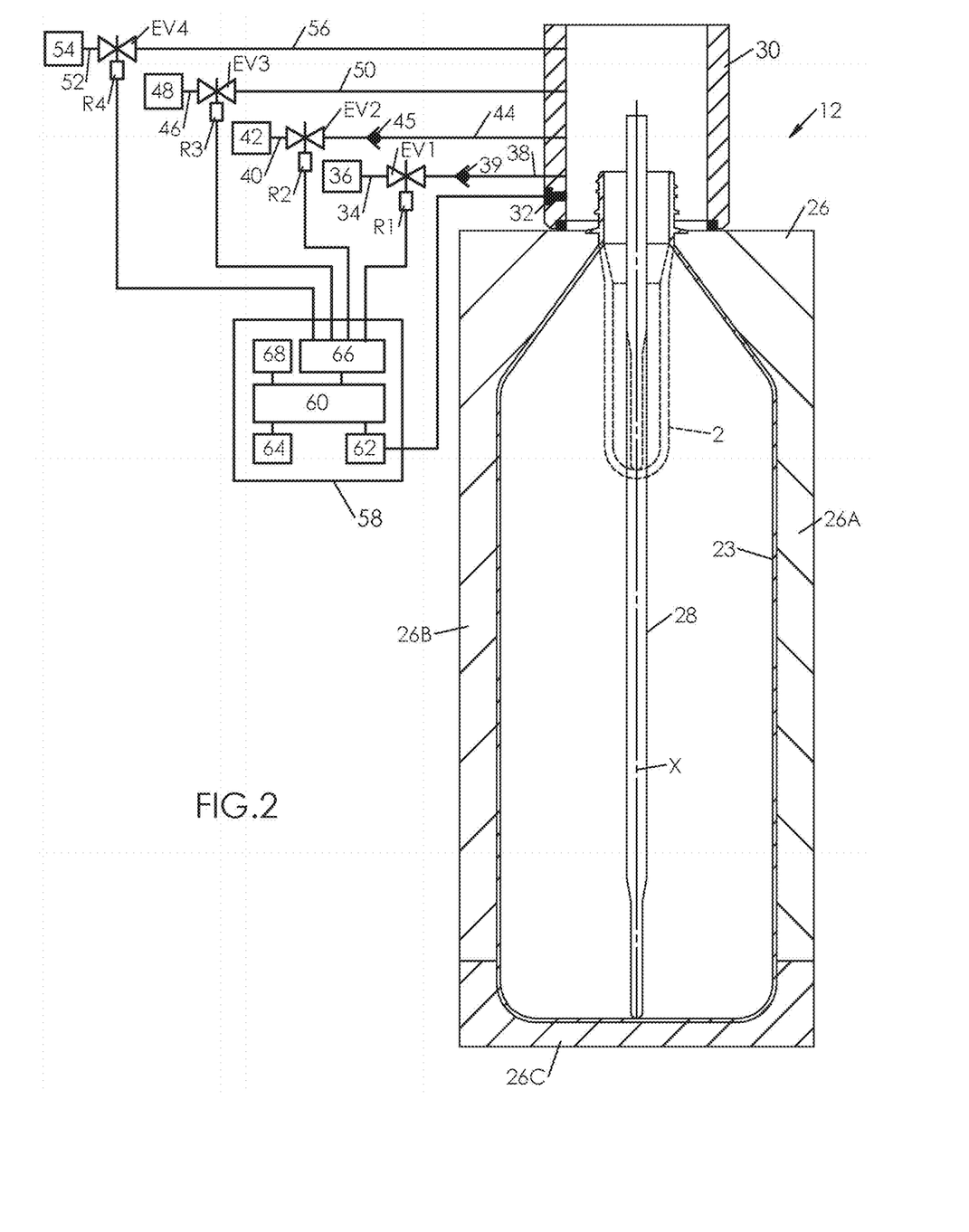
FIG. 2 is a diagrammatic cutaway view of a blow-molding station within the machine of FIG. 1.

In FIG. 2, a blow-molding station 22 is presented in detail. It comprises:
- a mold 26, of steel or aluminum alloy, consisting of two half-molds 26A, 26B and a mold bottom 26C, defining a cavity whose perimeter has the shape of the finished container 23 produced. The mold 26 is intended to receive successively hot blanks 2 coming from the oven 10,
- an elongation rod 28 mounted to move along the main axis X of the mold 26, between an upper position that makes possible the insertion of a blank 2 into the mold 26 when the latter is open and a lower position where the end of the rod 28 is in contact with the bottom of the mold. The passage from the upper position to the lower position is carried out to stretch the material axially along the axis X,
- a blow-molding nozzle 30, mounted to move between an upper position during the insertion of the blank 2 and a lower position where the lower end of this nozzle 30 caps the blank 2 in an airtight manner so as to bring the blow-molding air into the blank 2 to flatten the plastic material against the walls of the mold 26. The elongation rod 28 slides in the nozzle 30,
- a pressure sensor 32, coming out into the nozzle 30 to make a measurement there of the pressure prevailing in the closed space consisting of the nozzle 30 and the blank 2 during the operation for the blow molding of the container 23,
- a low-pressure pre-blow-molding circuit 34 of air of between 5 and 13 bars. This circuit 34 comprises a low-pressure source 36 and a duct 38 making it possible to route the air from the low-pressure source 36 to the nozzle 30 to form the future container 23 and an solenoid valve EV1, known as a pre-blow-molding solenoid valve, making possible the putting of the low-pressure source 36 in communication with the interior of the blank 2, via the nozzle 30. The solenoid valve EV1 is placed on the duct 38 between the low-pressure source 36 and the nozzle 30. The pre-blow-molding circuit 34 of air also has a non-return valve 39 that prevents fluid coming from another source or contained in the blank (or the container) from being introduced there,
- a high-pressure blow-molding circuit 40 of air, between 20 and 40 bars, which comprises a high-pressure source 42 and a duct 44 making it possible to route the fluid from the high-pressure source 42 to the nozzle 30 to form the future container and an solenoid valve EV2, known as a blow-molding solenoid valve, controlling the putting of the high-pressure source 42 in communication with the blank 2. The solenoid valve EV2 is placed on the duct 44 between the high-pressure source 42 and the nozzle 30. The blow-molding circuit 40 of air also has a non-return valve 45 that prevents fluid coming from another source or contained in the blank (or container) from being introduced there,
- a circuit 46 for recovery of the blow-molding air, which comprises a duct 50 making it possible to route the air contained in the container after its manufacture toward recovery means 48, such as a circuit or a recovery tank, and an solenoid valve EV3, a so-called recovery solenoid valve, controlling the establishment of communication between the container and the recovery means. The solenoid valve EV3 is placed on the duct 50 of the recovery circuit 46,
- a degassing circuit 52 making it possible to put the interior of the container in communication with the exterior, for the return to atmospheric pressure, before the raising of the nozzle 30 to the upper position, the degassing circuit 52 comprising a venting-to-the-atmosphere loop, one end of which is connected to a damper 54 so as to avoid any noise disturbance, and the other to a duct 56 connected to the nozzle 30, and an solenoid valve EV4, a so-called degassing solenoid valve, controlling the putting of the air contained in the container 23 in communication with the atmosphere,
- an electronic control unit 58, particularly in the form of a programmable logic controller (PLC), connected electrically to the pressure sensor 32, to the solenoid valves EV1, EV2, EV3, EV4 via their actuators R1, R2, R3, R4, and, if applicable, to the device for controlling the movement of the rod 28,
- a communication interface 68 for implementation in the control unit 58 of the program that regulates its operation.

Advantageously, the control unit 58 comprises:
- a processor 60,
- an analog input module 62 connected to the pressure sensor 32 to collect the measurements thereof and to convert them into digital signals for their processing by the processor,
- a memory 64 connected to the processor for the storage of data derived from the pressure sensor 32 (after conversion),
- an analog output module 66 controlled by the processor 60, and controlling the solenoid valves EV1, EV2, EV3, EV4 via their actuators R1, R2, R3, R4 so as to modulate the opening and the closing to have the flow of fluid provided to the nozzle 30 vary, and, if applicable, the device for controlling axial movement of the rod 28.

The opening and/or the closing of the solenoid valves EV1, EV2, EV3, EV4 is performed by means of respective actuators R1, R2, R3, R4 such as electromagnets.

For the practical implementation of the nozzle 30 and the incorporation of the solenoid valves, it is possible to refer to the application FR 2 872 082 or to its international equivalent WO 2006/008380.

The method for manufacturing a container such as a bottle by stretch blow molding is described below.

The blanks or blanks 2 enter into the oven 10, mounted on the conveyor that executes a U-shaped path. They are heated during the procession by the emitters 16.

The hot blanks 2 leaving the oven 10 are inserted successively into the molds 26 of the blow-molding station 22 thanks to an aforementioned first transfer device 18, well known to a person skilled in the art.

Once the mold 26 is closed, the nozzle 30 caps the blank 2 before the blow-molding fluid, which is generally air, is introduced into the blank 2.

As the method of blow-molding the container proceeds, the pressure prevailing in the nozzle 30 is measured continuously by the pressure sensor 32 and is transmitted to the control unit 58 so as to obtain a curve of the change in the pressure as a function of time.

Figure 3:
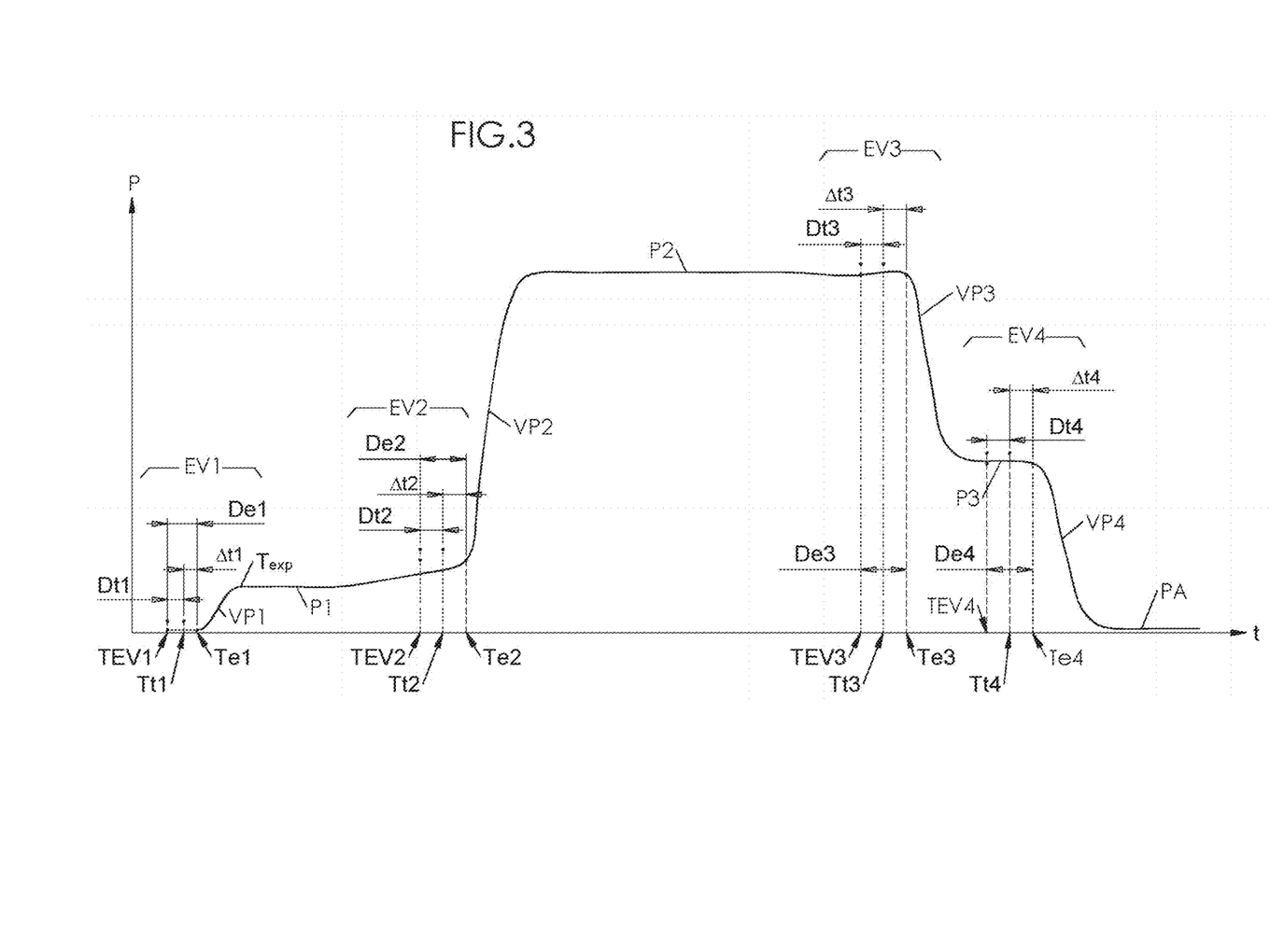
FIG. 3 shows a curve illustrating the different variations of pressure prevailing in a blank during the manufacture of a container.

FIG. 3 shows a curve illustrating the change in the pressure inside the blank during the different steps of the forming operation of the future container 23.

In this figure, the time in milliseconds appears on the axis of abscissa and the change in the pressure, in bars, on the axis of ordinate.

In this figure:

- the time Te1 constitutes the actual time of opening of the pre-blow-molding solenoid valve EV1. It is followed by a pressure variation VP1, consisting of a rapid increase of the pressure in the blank 2, until reaching the pre-blow-molding pressure, when the fluid begins to deform the blank 2, variation VP1 that is itself followed by an attenuated rise, similar to a plateau P1. These phenomena, well known, are due to the behavior of the blank during its initial deformation during the pre-blow-molding phase (usually accompanied by mechanical elongation);
- the time Te2 constitutes the actual time of opening of the blow-molding solenoid valve EV2. It precedes the blow-molding step. This step comprises two phases, respectively a phase with positive pressure variation VP2 in the interior of the blank, which corresponds to the impression-taking of the container, followed by a pressure plateau P2, which results from the end of the forming of the container and making possible a holding of the container in contact with the walls of the mold 26 so as to ensure a good taking of an impression;
- the time Te3 constitutes the actual time of the opening of the recovery solenoid valve EV3. It is followed by a rapid decrease in pressure (variation VP3), until reaching a stabilization plateau P3, which corresponds to a stage where the recovery circuits have reached a nominal level of pressure;
- the time Te4 constitutes the actual time of the opening of the degassing solenoid valve EV4. It is followed by a rapid decrease VP4 in pressure until reaching the atmospheric pressure PA in the container.

The actual delay De1, De2, De3, De4 of opening an solenoid valve, i.e., the time that passes between the time TEV1, TEV2, TEV3, TEV4 (also called "opening trigger pulse" in the description below) where an order for opening is sent to an solenoid valve and the time when the solenoid valve is actually opened, has a tendency to change as a function of certain parameters, such as, for example, the age of the solenoid valve EV1, EV2, EV3, EV4, the number of cycles to which it is subjected, the wear and tear of some of its components. This delay can increase or decrease.

When an solenoid valve EV1, EV2, EV3, EV4 leaves from manufacturing, it has a theoretical delay Dt1, Dt2, Dt3, Dt4 of opening, which constitutes the time that must pass between the opening trigger pulse and the time when the solenoid valve actually opens. It is a known constant, acknowledged as a function of certain tolerances.

However, if it is not provided by the builder, tests at the time of the breaking-in of the machine, before beginning production, make it possible to measure the time that the solenoid valve takes to be opened when it is new. This initial measured time becomes the theoretical delay.

The constancy of this parameter is essential for the proper operation of the machine and the perfect reproducibility of the method for manufacturing containers with the objective to obtain a good quality of containers.

The left part of FIG. 3 shows the change in the pressure in the blank during pre-blow-molding and blow-molding steps and the way in which the invention is implemented during these steps.

At the time TEV1, the control unit 58 gives an order for opening the pre-blow-molding solenoid valve EV1. This time is referred to as the opening trigger pulse. The opening makes it possible to put the low-pressure circuit of air in communication with the interior of the blank.

In practice, between the time TEV1 when the order for opening of the solenoid valve is given and the actual time Te1 of opening of the solenoid valve EV1, a certain time passes called actual delay De1 of opening.

This actual delay De1 of opening is calculated so as to identify a possible difference with a theoretical delay Dt1 of opening, which is the delay that should normally elapse between the opening trigger pulse TEV1 and the theoretical time Tt1 of opening (also called optimal time).

This calculation of the actual delay De1 of opening can be performed in different ways, identical for all of the solenoid valves of the machine.

In a first implementation, this actual delay De1 is calculated by the control unit 58 by analyzing the pressure curve. For this purpose, the unit 58 continuously controls the pressure prevailing in the blank, thanks to the pressure sensor 32 that comes out into the nozzle 30. After the opening trigger pulse TEV1 has been given, the control unit 58 detects, thanks to the signal from the pressure sensor 32, the occurrence of the pressure variation VP1 subsequent to the actual opening of the solenoid valve EV1. The unit 58 is thus able to determine the actual time Te1 (which corresponds to the beginning of the occurrence of the variation VP1) and to calculate the actual delay De1 of opening to approximately a few milliseconds: actually, reaching the nominal pre-blow-molding pressure is typically on the order of a few tens of milliseconds. The actual delay De1 is the one that passes between the time TEV1 and the time Te1.

In a variant, the determination of the actual time Te1 of opening is done by an accelerometer mounted on the solenoid valve EV1. The accelerometer detects, for example, the occurrence of an impact when the flap contained in the solenoid valve EV1 reaches a stop position.

In another variant, the determination of the actual time Te1 of opening is done by a movement detector associated with the flap or the control slide of the solenoid valve EV1. The detection of the beginning of the movement corresponds to the beginning of the opening.

The theoretical delay Dt1 of opening is stored in the control unit 58.

When it has determined the actual time Te1 of opening and therefore the actual delay De1 of opening, the control unit 58 calculates the difference Δt1 between the actual delay De1 of opening and the theoretical delay Dt1 of opening. In other words, it calculates the difference that separates the theoretical time Tt1 and the actual time Te1 of opening.

If the calculated difference Δt1 is greater than a maximum allowable difference, namely because the actual time Te1 occurs too soon (opening too fast) or too late (opening too slowly), then the control unit 58 transmits a notification of exceeding the maximum allowable difference.

The maximum allowable difference is also a constant that is documented during the manufacture of the solenoid valve or during the breaking-in of the machine before the machine is put in production.

This notification has the objective of indicating to the operator that the pre-blow-molding solenoid valve EV1 is no longer capable of ensuring a normal operation, i.e., of being opened (and a priori of being closed) in a span of time that has no impact on the quality of the future container or on the overall proper operation of the machine.

It can take different forms: a siren, a light signal, an indication at the control station of the machine, a degraded mode of the machine, a stopping of the defective station . . . .

After the time Te1, the pre-blow-molding solenoid valve EV1 is open, the blank is in communication with the pre-blow-molding circuit of air. According to the applications, the stretching rod 28 is activated simultaneously, so as to stretch the material of the blank along the axis X.

At the time Texp, an essentially radial expansion phase of the blank begins. Noted from this point is a plateau, even a slight decrease in pressure due to the radial expansion that is a function of the plastic flow threshold. Then, a new slight increase in the pressure occurs until the elongation rod 28 touches the bottom of the mold.

At the time TEV2, the control unit 58 gives an order for closing the pre-blow-molding solenoid valve EV1 and an opening trigger pulse from the blow-molding solenoid valve EV2, so as to cause the opening of the blow-molding solenoid valve EV2 and to put the interior of the blank in communication with the high-pressure circuit of air. The blow-molding solenoid valve EV2 is opened at an actual time Te2, from which, as shown on the curve, the pressure increases strongly (portion VP2) up to a stabilization plateau (plateau P2).

It is to be noted at this stage that the actual delay of closing of the pre-blow-molding solenoid valve EV1 is not important because of the presence of the non-return valve 39 in the pre-blow-molding circuit 34. This non-return valve 39 ensures that, if the pre-blow-molding solenoid valve EV1 is not closed quickly enough, then, because of the pressure differential, the pressure exerted by the high-pressure fluid immediately closes the non-return valve 39 again and thus prevents the low-pressure fluid from continuing to circulate. Furthermore, this non-return valve 39 prevents the high-pressure fluid from being directed toward the low-pressure pre-blow-molding circuit 34.

The calculation of the actual delay De2 of opening of the blow-molding solenoid valve EV2 and the calculation of the difference Δt2 can be done in the same manner as for the pre-blow-molding solenoid valve EV1.

Thus, in one implementation, the unit 58 controls the variations in pressure prevailing in the blank. When the control unit 58 has detected the occurrence of the pressure variation VP2 (thanks to the signal from the pressure sensor 32) subsequent to the actual opening of the blow-molding solenoid valve EV2 after the order for opening the blow-molding solenoid valve EV2, then it is therefore able to determine the actual time Te2 and to calculate the actual delay De2 of opening to approximately a few milliseconds: actually, the reaching of the nominal blow-molding pressure is also typically on the order of a few tens of milliseconds. The actual delay De2 is the one that passes between the time TEV2 and the time Te2.

In a variant, the determination of the actual time Te2 of opening is done by an accelerometer mounted on the blow-molding solenoid valve EV2. The accelerometer detects the occurrence of an impact when the flap contained in the blow-molding solenoid valve EV2 reaches a stop position.

In another variant, the determination of the actual time Te2 of opening is done by a movement detector associated with the flap or with the control slide of the blow-molding solenoid valve EV2.

After it has determined the actual time Te2 of opening the blow-molding solenoid valve EV2, the control unit 58 performs calculations similar to those performed previously for the pre-blow-molding solenoid valve EV1, so as to determine if the difference Δt2 between its actual delay De2 of opening and its theoretical delay Dt2 of opening is greater than or less than a maximum allowable difference.

If the calculated difference Δt2 is greater than a maximum allowable difference, namely because the actual time Te2 occurs too soon (opening too fast) or too late (opening too slowly), then the control unit 58 transmits a notification of exceeding the maximum allowable difference.

The right part of FIG. 3 shows the time change of the pressure in the blank during the recovery and degassing steps.

The operation of the recovery solenoid valve EV3 and of the degassing solenoid valve EV4 as well as the management of their delays and differences are largely comparable to what happens to the solenoid valves EV1, EV2 for pre-blow molding and blow molding.

Thus, at a predetermined time TEV3, the control unit 58 gives an order for closing the blow-molding solenoid valve EV2 and an order for opening (opening trigger pulse) the recovery solenoid valve EV3. The opening of the recovery solenoid valve EV3 makes it possible to put the interior of the hollow body contained in the mold 26 (it is now the formed container 23) in communication with the recovery circuit 46. This recovery circuit 46, well known to a person skilled in the art, makes it possible to recover the air located in the interior of the blow-molded container and to make use of it for another function such as hydraulics or the supply of air for another step of the forming process.

It is to be noted at this stage that the actual delay of closing of the blow-molding solenoid valve EV2 is not important, to the extent that, at the very least if it were closed a little late (i.e., with a few milliseconds of delay), a little high-pressure air would escape to the recovery circuit 46 and would therefore not be completely lost.

Just like for the other solenoid valves, the measuring of the actual delay De3 of opening of the recovery solenoid valve EV3 can be done by analyzing the pressure curve. After the trigger pulse has been given at the time TEV3, the control unit 58 detects (thanks to the signal from the pressure sensor 32) the occurrence of the pressure variation VP3, consisting of the sudden reduction of pressure subsequent to the actual opening of the recovery solenoid valve EV3. The control unit 58 is thus able to determine the actual time Te3 of opening and to calculate the actual delay De3 of opening to approximately a few milliseconds: actually, the recovery begins in a few tens of milliseconds. The actual delay De3 is the one that passes between the time TV3 and the actual time Te3 of opening.

In a variant, the determination of the actual time Te3 of opening is done by an accelerometer mounted on the recovery solenoid valve EV3. The accelerometer detects the occurrence of an impact when the flap contained in the solenoid valve reaches a stop position.

In another variant, the determination of the actual time Te3 of opening is done by a movement detector associated with the flap or with the control slide of the recovery solenoid valve EV3.

From the actual time Te3, the recovery solenoid valve EV3 is open so that the phase for recovery of the air that is in the container begins. The recovery can be performed, in a known way, in a tank 48, for example.

The control unit 58 performs the same operations as those performed for the pre-blow-molding or blow-molding solenoid valves EV1, EV2, but this time with the recovery solenoid valve EV3, to determine the difference Δt3 between the actual time Te3 of opening and the theoretical time Tt3 of opening for the recovery solenoid valve EV3.

After it has determined the actual time Te3 of opening of the recovery solenoid valve EV3, the control unit 58 performs calculations similar to those previously performed for the pre-blow-molding solenoid valve EV1, so as to determine if the difference Δt3 between its actual delay De3 of opening and its theoretical delay Dt3 of opening is greater than or less than a maximum allowable difference.

If the calculated difference Δt3 is greater than a maximum allowable difference, namely because the actual time Te3 occurs too soon (opening too fast) or too late (opening too slowly), then the control unit 58 transmits a notification of exceeding the maximum allowable difference.

At the time TEV4, the control unit 58 gives an order for closing the recovery solenoid valve EV3 and an order for opening the degassing solenoid valve EV4. This time is referred to as the opening trigger pulse. The opening of the degassing solenoid valve EV4, at the actual time Te4, makes it possible to put the interior of the container in communication with the atmosphere by means of a damper.

As seen previously, the measuring of the actual delay De4 of opening can be performed by analyzing, thanks to the measurement from the sensor, the fall in pressure VP4 that follows the opening of the degassing solenoid valve EV4, or even using the signal transmitted by an accelerometer or by detection of the movement of the flap or of a control element of the degassing solenoid valve EV4.

From the actual time Te4, the degassing solenoid valve EV4 is open and begins then the phase of degassing of the air that is found in the blank. It is noted that from this point, there is a fall in pressure due to the venting of the air in the blank to reach equilibrium with the atmospheric pressure.

The control unit 58 performs the same operation as those performed previously, but this time with the degassing solenoid valve EV4, to determine the difference Δt4 between its actual delay De4 of opening and the theoretical delay Dt4 of opening.

If the calculated difference Δt4 is greater than a maximum allowable difference, namely because the actual time Te4 occurs too soon (opening too fast) or too late (opening too slowly), then the control unit 58 transmits a notification of exceeding the maximum allowable difference.

In the preceding description portion, it has been indicated that a notification of exceeding the maximum allowable difference is performed as soon as, for an solenoid valve EV1, EV2, EV3, EV4, a calculated difference Δt1, Δt2, Δt3, Δt4 that is greater than a maximum allowable difference occurs. However, acting in this way can be the cause of unjustified maintenance operations. One-time differences that are not necessarily connected to damage or another undesired event can actually occur.

This is why, in one implementation, the control unit 58 is configured to store—during the manufacture of the containers—a number of calculated differences Δt1, Δt2, Δt3, Δt4 for each solenoid valve EV1, EV2, EV3, EV4, so as to determine if there is a recurrence of cases of exceeding the maximum allowable difference on a given solenoid valve and to transmit the notification of exceeding. Preferably, in this case, it is appropriate to transmit the notification as soon as the number of consecutive differences exceeding the maximum allowable difference reaches a predetermined value, so as to avoid resulting in too many defective containers. By way of example, the notification can be transmitted as soon as ten consecutive differences on one solenoid valve exceed the maximum allowable value.

In a variant, the control unit 58 is programmed to store the consecutive differences Δt1, Δt2, Δt3, Δt4 of a solenoid valve EV1, EV2, EV3, EV4 of the machine 1 and to calculate from them the mean value, and then, if the calculated mean value is greater than a maximum allowable difference, to transmit a notification of exceeding the maximum difference.

Mathematical operations other than the mean value can be performed on the differences such as the calculation of a standard deviation, for example.

Regardless of the implementation, the storage and/or the calculation of a mean value or a standard deviation, even if they do not lead to the transmission of a notification of exceeding, to the extent that the counted or calculated differences for an solenoid valve would be allowable, can, however, be used to evaluate the future behavior of the solenoid valve EV1, EV2, EV3, EV4. Thus, for example, if it appears that the differences increase in such a way that their number or their value approaches the maximum allowable difference, the notification can be anticipated.

In an improved implementation, the control unit 58 furthermore measures the time that the fluid contained in the container takes to return to atmospheric pressure. This period makes it possible to have an idea of the state of the damper. Actually, as the future containers are produced, the damper becomes clogged with particles, for example by residual particles of PET. This prevents the proper release of the air and thus increases the time of the degassing step. Consequently, the control unit 58 performs the same operation as the one performed previously, but this time with the damper to determine a difference between the end of the actual degassing and the end of the theoretical degassing that is a constant that is documented by the operator in the same manner as the theoretical time of opening of the solenoid valves.

The manufacturing method that has just been described offers various advantages, including:

it makes it possible to detect the deviation of the solenoid valves, and thus to optimize the efficiency of the machine;

it also makes possible a scheduling of the phases of maintenance of the different solenoid valves of the machine.

Of course, the invention is not limited to the embodiments specifically described. On the contrary, it encompasses all of the equivalents or all of the variants within the scope of a person skilled in the art.

The invention claimed is:

1. Method for manufacturing containers (23) by blow molding in a mold of blanks (2) of plastic material, comprising, during the manufacture of a container:

a step for inserting a blank (2) into a mold (26);

at least one step for putting the interior of the blank (2) in communication with at least one fluid circuit (34; 40; 46; 52) by means of a solenoid valve (EV1; EV2; EV3; EV4) comprising a fluid valve associated with said fluid circuit (34; 40; 46; 52) and an actuator (R1, R2, R3, R4) driven by a solenoid driver, the fluid valve comprising:

a valve body including a stop which is stationary with respect to the fluid circuit, and a moveable valve element being moved by the actuator between (i) a closed position wherein the moveable valve element prevents the fluid from passing through the fluid valve and (ii) a fully opened position wherein the mobile valve element is stopped by contacting the stop and allows the fluid to pass through the fluid valve;

at a specific time, referred to as solenoid valve opening trigger pulse (TEV1; . . . ; TEV4), sending an opening order to said solenoid driver, the solenoid valve (EV1; EV2; EV3; EV4) having a theoretical delay (Dt1; . . . ; Dt4) of opening, i.e., a time that theoretically must pass between the opening trigger pulse and a time when the valve element actually reaches the fully opened position;

wherein the method further comprises steps consisting in:
receiving, continuously from a pressure sensor 32, a measured pressure within a nozzle (30) positioned at the mold (26);

receiving the theoretical delay (Dt1; . . . ; Dt4) from a memory (64) of a control unit (58);

determining an actual delay (Del; . . . ; De4) of opening of said solenoid valve (EV1; EV2; EV3; EV4), i.e., a time passed between the opening trigger pulse and an actual time (Tel; . . . ; Te4) when the valve element reaches the fully opened position;

calculating a difference (Δt1; . . . ; Δt4) between the actual delay (De1; . . . ; De4) of opening and the theoretical delay (Dt1; . . . ; Dt4) of opening;

if the difference calculated is greater than a maximum allowable difference, transmitting, from the control unit (58), a notification of exceeding the maximum allowable difference to a notification device.

2. Method for manufacturing containers according to claim 1, wherein the actual time (Tel; . . . ; Te4) when the valve element reaches the fully opened position is determined by detecting a pressure variation (VP1; . . . ; VP4) occurring in the blank (2) or the container being formed after the opening trigger pulse has been given.

3. Method for manufacturing containers according to claim 2, further comprising a step consisting in determining if there is a recurrence of cases of exceeding the maximum allowable difference before transmitting the notification from the control unit (58).

4. Method for manufacturing containers according to claim 2, further comprising a step consisting in storing a number of calculated differences (Δt1; . . . ; Δt4) for said solenoid valve (EV1; EV2; EV3; EV4);
calculating a mean value from said stored differences;
if the calculated mean value is greater than a maximum allowable difference, transmitting said notification of exceeding the maximum allowable difference.

5. Method for manufacturing containers according to claim 1, wherein the actual time (Tel; . . . ; Te4) when the valve element reaches the fully opened position is determined by detecting the occurrence of an impact when the valve element contained in the fluid valve the stop.

6. Method for manufacturing containers according to claim 5, further comprising a step consisting in determining if there is a recurrence of cases of exceeding the maximum allowable difference before transmitting the notification from the control unit (58).

7. Method for manufacturing containers according to claim 5, further comprising a step consisting in storing a number of calculated differences (Δt1; . . . ; Δt4) for said solenoid valve (EV1; EV2; EV3; EV4);
calculating a mean value from said stored differences;
if the calculated mean value is greater than a maximum allowable difference, transmitting said notification of exceeding the maximum allowable difference.

8. Method for manufacturing containers according to claim 1, wherein the actual time (Te1; . . . ; Te4) when the valve element reaches the fully opened position is determined by detecting an end of a movement of the valve element.

9. Method for manufacturing containers according to claim 8, further comprising a step consisting in determining if there is a recurrence of cases of exceeding the maximum allowable difference before transmitting the notification from the control unit (58).

10. Method for manufacturing containers according to claim 8, further comprising a step consisting in storing a number of calculated differences (Δt1; . . . ; Δt4) for said solenoid valve (EV1; EV2; EV3; EV4);
calculating a mean value from said stored differences;
if the calculated mean value is greater than a maximum allowable difference, transmitting said notification of exceeding the maximum allowable difference.

11. Method for manufacturing containers according to claim 1, further comprising a step consisting in determining if there is a recurrence of cases of exceeding the maximum allowable difference before transmitting the notification from the control unit (58).

12. Method of manufacturing containers according to claim 1, further comprising a step consisting in storing a number of calculated differences (Δt1; . . . ; Δt4) for said solenoid valve (EV1; EV2; EV3; EV4);
calculating a mean value from said stored differences;
if the calculated mean value is greater than a maximum allowable difference, transmitting said notification of exceeding the maximum allowable difference.

13. Method for manufacturing containers according to claim 1, which comprises steps consisting in:
storing a number of calculated differences (Δt1; . . . ; Δt4) for an solenoid valve (EV1; EV2; EV3; EV4);
calculating a standard deviation from said stored differences;
if the standard deviation calculated is greater than a maximum allowable difference, transmitting said notification of exceeding the maximum allowable difference.

14. Method for evaluating a future behavior of an apparatus for manufacturing a series of containers (23) by a series of blow molding cycles of a series of blanks (2) of plastic material, comprising, during each of the blow molding cycles:
a step for inserting a blank (2) into a mold (26);
at least one step for putting the interior of the blank (2) in communication with at least one fluid circuit (34; 40; 46; 52) by means of a solenoid valve (EV1; EV2; EV3; EV4) associated with said fluid circuit (34; 40; 46; 52);
at a specific time, referred to as solenoid valve opening trigger pulse (TEV1; . . . ; TEV4), sending an opening order to said solenoid valve (EV1; EV2; EV3; EV4) that has a theoretical delay (Dt1; . . . ; Dt4) of opening, i.e., a time that theoretically must pass between the opening trigger pulse and the time when the solenoid valve (EV1;

EV2; EV3; EV4) actually opens;
wherein the method further comprises for a plurality blow molding cycles, steps comprising:
calculating a plurality of actual delays of opening of said solenoid valve (EV1; EV2; EV3; EV4), each actual delay being a time passed between the opening trigger pulse and an actual time of opening of the solenoid valve (EV1; EV2; EV3; EV4) during one of the blow molding cycles;
calculating a plurality of differences, each difference being calculated between the actual delay (De1; ... ; De4) of opening and the theoretical delay (Dtl; ... ; Dt4) of opening for one of the blow molding cycles;
calculating a parameter issued from said plurality of differences;
if the calculated parameter is greater than a maximum allowable value, transmitting a notification related to a future behavior of the apparatus.

15. Method according to claim 14, wherein the parameter includes a group comprising: a number of said differences exceeding a threshold; a mean value of the plurality of differences, a standard deviation of the plurality of differences, or a combination thereof.

\* \* \* \* \*